Feb. 10, 1942.  C. A. OTTO  2,272,815
REGULATING DEVICE
Filed Sept. 12, 1938
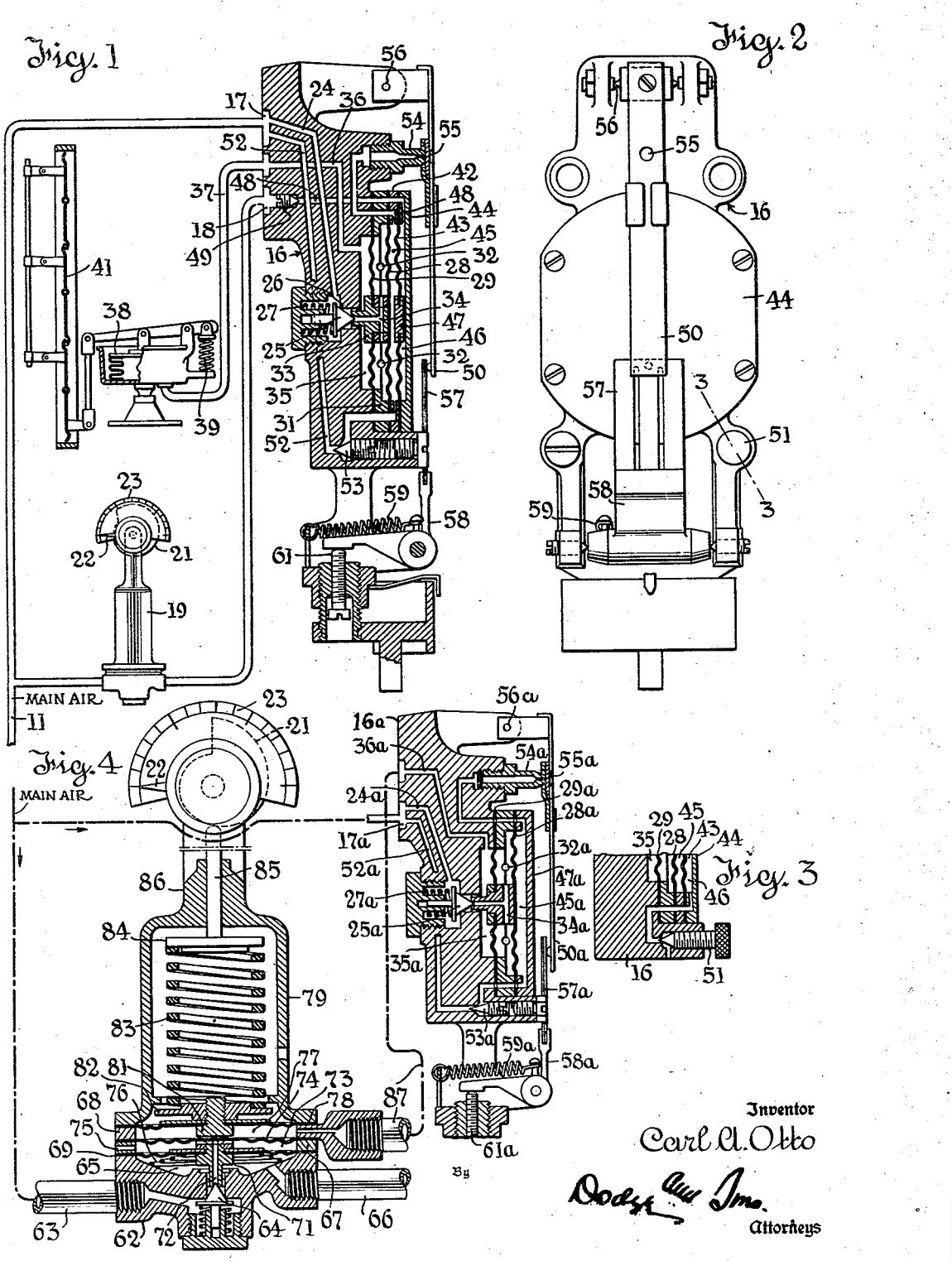
Inventor
Carl A. Otto
By Dodge and Imo
Attorneys Patented Feb. 10, 1942

2,272,815

UNITED STATES PATENT OFFICE 2,272,815

REGULATING DEVICE

Carl A. Otto, Milwaukee, Wis., assignor to Johnson Service Company, Milwaukee, Wis., a corporation of Wisconsin Application September 12, 1938, Serial No. 229,636

7 Claims. (Cl. 236—82)

This invention relates to devices for regulating atmospheric conditions such for example as temperature and humidity, and relates particularly to improvements in the relay mechanism described and claimed in the patent to Otto, No. 1,500,260, July 8, 1924. That patent describes a relay in which an abutment structure subjected in one direction to the controlling pressure and in the other direction to the controlled pressure, operates an inlet and exhaust valve mechanism which functions to vary the controlled pressure so that a balance is maintained between it and the controlling pressure.

As shown in the aforesaid Otto patent, the diaphragm structure may have different effective areas subject to the controlling pressure and the controlled pressure, and where this arrangement is used the controlled pressure will vary in direct proportion to the controlling pressure but will not be strictly equal thereto. This type of relay has been extensively used in conjunction with thermostats and humidostats, the thermostatic element serving to vary the controlling pressure by means of the well known leak port mechanism. The controlled pressure has been used to actuate various types of motor, notably damper motors, valve motors, and similar mechanisms familiar to those skilled in the arts of temperature and humidity regulation.

The purpose of the present invention is to permit the application of a secondary control which acts through the relay and may itself respond to a second controlling pressure. This pressure may be developed pneumatically, or it may be developed by other yielding means such as a variably stressed spring. The secondary control is so related to the relay mechanism that the secondary control takes effect to the exclusion of the primary control if the secondary control predominates, whereas the primary control takes effect to the exclusion of the secondary control if the primary control dominates. Thus a completely selective action is had and the principle is applicable to the attainment of a number of useful functions.

For example, and as illustrated in the preferred embodiment of the invention, the primary control might be in response to room temperature. The secondary control might be set to establish a minimum value on the operation of the primary control so that if the primary control attempted to function beyond the limited range established, the secondary control would take over. In the preferred embodiment of the invention the secondary control involves the use of an adjustable pressure maintaining valve, the adjustment being made manually. Obviously, such an adjustment might be secured by any means, according to the particular results which it is desired to secure.

Broadly stated, the invention provides a relay which will automatically respond to either of two pressures, depending on which of the two is higher. Further, one of the pressures might be fluid pressure and the other might be developed by a loading spring, for example. If a spring is used in the arrangement of Fig. 1 the loading spring would establish the minimum value below which the primary controlling pressure could not exercise its regulatory function. The scheme is open to a wide variety of applications and the specific disclosures hereinafter made are intended to be illustrative and not limiting.

In the drawing:

Fig. 1 represents a thermostat of the leak port type exercising primary control on a duplex relay, the secondary control being exercised by an adjustable pressure maintaining valve. The controlled pressure developed in the relay is used to operate a damper motor.

Fig. 2 is a front elevation of the thermostat and relay shown in Fig. 1.

Fig. 3 is a fragmentary view on the line 3—3 of Fig. 2 showing a valve applied to the relay for the purpose of cutting out the secondary control locally.

Fig. 4 is a sectional view showing a pressure controlling relay responsive primarily to a fluid pressure and secondarily to an adjustable spring pressure, and intended for use with a pneumatic thermostat or the like, a pneumatic thermostat being shown.

Referring first to Figs. 1 and 2, the pipe 11 is a supply line for air under pressure, say 15 pounds gage. It leads to the body 16 of the relay, directly to the air supply connection 17, and indirectly to the secondary control connection 18, through the adjustable pressure regulating valve 19.

The valve 19 is simply a low-side control reducing valve adjustable by setting cam 21 to maintain in the connection 18 any pressure from atmospheric to supply pressure (assumed to be 15 pounds gage). The valve 19 has admission and exhaust functions so that the controlled pressure in 18 may be raised and lowered by turning cam 21. A pointer 22 indicates the setting on dial 23.

From air supply connection 17 port 24 leads to the space behind the cone valve 25 which is urged closed against supply seat 26 by spring 27. Mounted on the front of body 16 is the primary diaphragm structure of the relay comprising a front diaphragm 28, a slightly smaller rear diaphragm 29, a marginal spacing ring 31 with atmospheric vent ports 32 and a central hub 33 connected with diaphragm 29 and in thrust with diaphragm 28. Hub 33 has an axial exhaust port 34 leading by radial extensions to the space between diaphragms 28 and 29 which is vented to atmosphere by the ports 32. The forward (right hand) end of cone valve 25 coacts with port 34 to form an exhaust valve.

The space 35 at the rear of diaphragm 29 is the controlled chamber and is connected by port 36 and branch line 37 with the controlled device, here shown as a single acting bellows motor 38 (with return spring 39) connected to actuate a louver damper 41. With the diaphragms in their neutral positions their inherent elasticity is such that the inlet valve 25 is held closed by spring 27 and the exhaust valve open. Hence, port 34 vents chamber 35, but as the hub 33 is forced inward valve 25 first seals exhaust port 34 and is then forced from supply seat 26 to admit air to chamber 35.

Overlying diaphragm 28 are a spacing ring 42, secondary diaphragm 43, and cover 44, which define the primary controlling chamber 45 and the secondary controlling chamber 46. The secondary diaphragm 43 carries a hub or thrust button 47 at its center to react in one-way thrust inward against the primary diaphragm structure in line with hub 33.

The secondary controlling chamber 46 is connected by port 48 with secondary control connection 18, a needle valve 49 being used to restrict flow. This restriction permits the use of a local vent valve 51 which when open freely vents and thus disables the secondary control chamber 46 (Fig. 3).

The valve 51 is normally closed and in many cases it is omitted altogether. When a plurality of thermostats are subject to secondary control by a single valve 19 it is sometimes useful to free a particular thermostat from such secondary control by a local manipulation. This is the function of valve 51.

Pressure in the primary controlling chamber 45 is regulated thermostatically. A supply port 52 leads from connection 17 past throttling needle valve 53 to chamber 45. A leak port 54 vents the chamber 45 and when wide open has a flow capacity greater than the adjusted supply capacity of valve 53. The port 54 is variably throttled by valve 55 pivoted at 56 and closing by gravity under the control of the responsive element, here shown as a bimetallic thermostatic bar 57. Bar 57 is mounted on an adjustable base 58 of conventional form, being biased by spring 59 against adjustable stop screw 61. The upper end of bar 57 reacts against the free end of arm 50 to control the valve 55.

The device shown in Figs. 1 to 3 subjects the pressure in motor 38 to two controls, a primary control responsive to temperature, and a secondary control responsive to the setting of valve 19. Assuming for example that motor 38 opens the dampers in response to rising temperature, valve 19 would set a limit on the closing movement of the dampers by positioning button 47 with respect to diaphragm 28.

Obviously the arrangement shown in Figs. 1 to 3 is such that the primary and secondary controls will each assume control of motor 38 to the exclusion of the other depending on which tends to establish the higher branch line pressure.

Such duplex control through a single duplex relay can be worked out variously. It is not essential that control of valve 19 be manual. The relay shown is direct acting but similar relays which are reverse acting are known (Otto, Patent No. 1,726,409, August 27, 1929) and could be subjected similarly to secondary control, in which event the secondary control would oppose the primary. Thus the invention has a wide field of application to accomplish a number of useful effects, some of which are patentably distinct from the broad concept of duplex action to which the present application is directed.

One illustration of the application of duplex control of pneumatic relays by automatic means is given in Fig. 4. In that figure the principle is applied by use of an adjustable loading spring which takes the place of the secondary controlling chamber 46 of Fig. 1, and by way of example the device is illustrated as being under the control of a pneumatic thermostat. It is obvious that any equivalent controlling means may be employed, hence the illustration is not limiting.

Referring to Fig. 4, 62 designates a housing or base having a main air connection 63, which through a spring biased inlet valve 64 controls the supply of air to chamber 65 and thence to branch line 66. The base 62 carries two rings 67 and 68. Interposed between ring 67 and base 62 is a diaphragm 69 carrying a hub 71 containing an exhaust channel 72 communicating with the chamber 73 between diaphragm 69 and a second diaphragm 74 mounted between the rings 67 and 68. The chamber 73 is vented to atmosphere at 75 and a spring 76 in chamber 65 biases the diaphragm 69 to a position where the exhaust valve is held open.

The branch chamber 65 is the controlled chamber and a controlling chamber 77 is formed by a diaphragm 78 resting on ring 68 and held in place by the sealing flange of a housing 79. The diaphragm 78 carries a button 81 adapted to limit the upward movement of diaphragm 74 and this button is threaded into a disc-like spring seat 82 carrying an adjustable loading spring 83. This spring is adjusted by rotatable cam 21 reacting against pin 85 carried by seat 84. The pin 85 is guided in its movement by boss 86 on housing 79.

It will be evident that variations in pressure in chamber 77 will produce corresponding variations in branch line pressure; also that any desired lower limit of pressure response of diaphragm 74 to pressures within chamber 77 may be set by adjustment of spring 83. Accordingly, by controlling the variation of pressure in chamber 77 the branch line pressure may be controlled over numerous predetermined ranges of pressure. One means of control may be by thermostat as illustrated. Other equivalent means are contemplated.

As shown, chamber 77 is connected to a leak port relay of the thermostatic type disclosed in the patent to Otto, No. 1,500,260, referred to above. Structurally this relay corresponds closely to the device of Fig. 1, but omitting the diaphragm 43 and the connection to valve 19. The description has been simplified by using the same reference characters for corresponding parts in Figs. 1 and 4, with the addition of *a* in Fig. 4. For example, the base is designated 16a in Fig. 4. The pilot or controlling chamber 77 is connected to what is ordinarily designated the branch line chamber of relay 16a as by line 87.

The operation of the system of Fig. 4 will be obvious from the description of Fig. 1 since the thermostat at 57a will act to vary the pressure in chamber 77 and to control the pressure in branch line 66, supplying the controlled device. Adjustment of spring 83 will set the range of response of the duplex relay under the control of thermostat 57a or equivalent means.

Although only two embodiments of the invention are shown herein, it is to be understood that the invention is not limited except as required by the terminology used in the claims.

What is claimed is:

1. The combination of a source of pressure fluid; a fluid pressure operated device to be controlled by varying the pressure thereon; means forming a controlled chamber connected with said device; means forming a controlling chamber; a movable abutment separating said chambers and adapted to move in response to pressure differentials between said chambers; means yieldably urging said abutment toward the controlling chamber; an inlet and exhaust valve mechanism arranged to be actuated by said abutment and serving to close the exhaust and admit pressure fluid to the controlled chamber when the abutment moves toward the controlled chamber, and to terminate the supply and open the exhaust on reverse movement; means responsive to an atmospheric condition for establishing different fluid pressures in the controlling chamber; loading means independent of the last named fluid pressure for urging said abutment toward said controlled chamber, said loading means comprising a flexible diaphragm defining a wall of the controlling chamber; and means for forcing said diaphragm into thrust relation with said abutment.

2. The combination of a source of pressure fluid; a fluid pressure operated device to be controlled by varying the pressure thereon; means forming a controlled chamber connected with said device; means forming a controlling chamber; a movable abutment separating said chambers and adapted to move in response to pressure differentials between said chambers; means yieldably urging said abutment toward the controlling chamber; an inlet and exhaust valve mechanism arranged to be actuated by said abutment and serving to close the exhaust and admit pressure fluid to the controlled chamber when the abutment moves toward the controlled chamber, and to terminate the supply and open the exhaust on reverse movement; means responsive to an atmospheric condition for establishing different fluid pressures in the controlling chamber; loading means independent of the last named fluid pressure for urging said abutment toward said controlled chamber, said loading means comprising a flexible diaphragm defining a wall of the controlling chamber; and means for subjecting said diaphragm to fluid pressure at will to cause it to react against said abutment.

3. The combination of a source of pressure fluid; a fluid pressure operated device to be controlled by varying the pressure thereon; means forming a controlled chamber connected with said device; means forming a controlling chamber; a movable abutment separating said chambers and adapted to move in response to pressure differentials between said chambers; means yieldably urging said abutment toward the controlling chamber; an inlet and exhaust valve mechanism arranged to be actuated by said abutment and serving to close the exhaust and admit pressure fluid to the controlled chamber when the abutment moves toward the controlled chamber, and to terminate the supply and open the exhaust on reverse movement; means responsive to an atmospheric condition for establishing different fluid pressures in the controlling chamber; loading means independent of the last named fluid pressure for urging said abutment toward said controlled chamber, said loading means comprising a flexible diaphragm defining a wall of said controlling chamber; and means for developing an elastic force on said diaphragm.

4. The combination of a source of pressure fluid; a fluid pressure operated device to be controlled by varying the pressure thereon; means forming a controlled chamber connected with said device; an abutment adjacent said controlled chamber and movable in response to pressure variations in said controlled chamber; means yieldably urging said abutment away from said controlled chamber; an inlet and exhaust valve mechanism arranged to be actuated by said abutment and serving to close the exhaust and admit pressure fluid to the controlled chamber when the abutment moves toward the controlled chamber, and to terminate the supply and open the exhaust on reverse movement; adjustable loading means for urging said abutment toward said controlled chamber; a controlling chamber; and means responsive to an atmospheric condition for establishing fluid pressures in the controlling chamber in opposition to said loading means.

5. The combination of a source of pressure fluid; a controlling motor of the fluid pressure type; admission and exhaust valve means for selectively admitting and exhausting pressure fluid to and from said motor; actuating abutment means connected to actuate said valve means and subject to fluid pressure in said motor acting in a direction to close admission and open exhaust; a pneumatic thermostat serving to control a regulatory fluid pressure acting on said abutment in the opposite direction; a second abutment operable by fluid pressure and arranged in tandem one-way thrust relation with said actuating abutment means; and adjustable means for maintaining fluid pressure on the last named abutment, the parts being so arranged that the last named abutment establishes an effective minimum for the regulatory action of said pneumatic thermostat corresponding to the pressure to which the second abutment is subjected.

6. The combination of a source of pressure fluid; a controlling motor of the fluid pressure type; admission and exhaust valve means for selectively admitting and exhausting pressure fluid to and from said motor; actuating abutment means connected to actuate said valve means and subject to fluid pressure in said motor acting in a direction to close admission and open exhaust; a pneumatic thermostat serving to control a regulatory fluid pressure acting on said abutment in the opposite direction; a second abutment operable by fluid pressure and arranged to impose a bias on said valve means; and adjustable means for subjecting said second abutment to fluid pressure, whereby an adjustable bias is afforded.

7. In an automatic temperature regulating system, the combination of a source of pressure fluid; a relay device comprising a controlled chamber, a primary controlling chamber, and a secondary controlling chamber; admission and exhaust valve mechanism for controlling the supply of pressure fluid from said source to said controlled chamber, and exhaust of pressure fluid therefrom; a first movable abutment means connected to actuate said valve mechanism and responsive to pressure differentials between said controlled chamber and said primary controlling chamber; a second abutment means subject to pressure in said secondary controlling chamber and adapted to assume control of said valve mechanism in conjunction with said first abutment means; means responsive to variations of an atmospheric condition for controlling the pressure in the primary controlling chamber; and adjustable means for varying the pressure in the secondary controlling chamber through a pressure range limited to a portion of the effective pressure range in the primary chamber, whereby the two abutments assume control selectively through different pressure ranges.

CARL A. OTTO.